US009016792B2

(12) United States Patent
Muck

(10) Patent No.: US 9,016,792 B2
(45) Date of Patent: Apr. 28, 2015

(54) STRIKER PIN SUPPORT BRACKET

(71) Applicant: Toyota Motor Engineering & Manufacturing North America, Inc., Erlanger, KY (US)

(72) Inventor: Todd Rupert Muck, Fowlerville, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 115 days.

(21) Appl. No.: 13/663,555

(22) Filed: Oct. 30, 2012

(65) Prior Publication Data

US 2014/0117733 A1     May 1, 2014

(51) Int. Cl.
*B60N 2/02* (2006.01)
*B60N 2/24* (2006.01)
*B60N 2/30* (2006.01)

(52) U.S. Cl.
CPC . *B60N 2/24* (2013.01); *B60N 2/305* (2013.01)

(58) Field of Classification Search
CPC ......... B60N 2/305; B60N 2/3011; B60N 2/24
USPC ....................... 297/14, 331, 335, 336, 378.13
See application file for complete search history.

(56) References Cited

U.S. PATENT DOCUMENTS

| 3,880,464 | A | * | 4/1975 | Murphy et al. ................ 297/326 |
| 4,475,769 | A | * | 10/1984 | Crawford et al. ............. 297/331 |
| 6,672,634 | B2 | | 1/2004 | Burton |
| 6,773,068 | B2 | * | 8/2004 | Shinozaki .................. 297/344.1 |
| 7,147,257 | B2 | * | 12/2006 | Johansen et al. .......... 292/341.15 |
| 7,703,818 | B2 | | 4/2010 | Fannon et al. |
| 7,703,828 | B2 | | 4/2010 | O'Connor et al. |
| 8,167,341 | B2 | | 5/2012 | Gruber et al. |
| 8,388,054 | B2 | * | 3/2013 | Sayama .......................... 297/15 |
| 2008/0224520 | A1 | * | 9/2008 | Veluswamy et al. .......... 297/335 |
| 2012/0133188 | A1 | * | 5/2012 | Wieclawski et al. ..... 297/378.13 |

* cited by examiner

*Primary Examiner* — Elizabeth A Plummer
(74) *Attorney, Agent, or Firm* — Gifford, Krass, Sprinkle, Anderson & Citkowski, P.C.

(57) ABSTRACT

A seat portion is pivotally mounted to a seat back at a main pivot point. A striker pin is mounted to the seat portion. The striker pin includes a free end. A bracket is further connected to the main pivot point wherein the bracket includes a main body. The bracket further includes an arm extending away from the main body. The arm extends away from the main body to support the free end of the pin to further support the striker pin during a latched construction. The main body of the bracket and the arm of the bracket support the free end of the pin during rotation of the seat portion towards the seat back from a down position to an up position allowing for a fixed latch on the seat back to engage with the pin of the seat portion.

12 Claims, 4 Drawing Sheets

STRIKER PIN SUPPORT BRACKET

FIELD OF THE INVENTION

The present invention relates generally to tip-up seat assemblies. More particularly, this invention relates to striker pin assemblies for tip-up seat assemblies.

BACKGROUND OF THE INVENTION

Tip-up seats are frequently used in vehicles, such as rear truck seats, providing the user the opportunity to fold up the seat to provide for more room within the truck interior. The seats are commonly mounted to a rear vehicle cabin wall or to the floor of the vehicle cabin. As the seat portion of the seat assembly tips up towards the seat back of the seat assembly, the striker pin of the assembly mounted to the seat portion moves towards the latch fixedly located on the seat back portion of the seat assembly. As the striker pin moves towards the latch, the free end of the striker pin is free to move. The unsupported free end of the striker pin frequently results in misconnection of the latch to the striker pin or unwanted unlatching of the striker pin from the latch.

FIGS. 7 and 8 illustrate this example of the prior art. The striker pin is shown having a free end and a striker pin head. The main pivot and main pivot bolt support the seat portion as the seat portion rotates up to the seat back in a stowed position. As the seat portion rotates upwards towards the seat back, the striker pin rotates downwards to the latch. The unsupported striker pin and free end of the striker pin frequently do not successfully meet with the latch since the striker pin is not stable or supported.

SUMMARY OF THE INVENTION

The present invention relates to an automotive vehicle seat assembly including a seat portion and a back portion. The seat portion is pivotally mounted to the seat back at a main pivot point. A pin is mounted to the seat portion. The pin includes a free end. A bracket is further connected to the main pivot point wherein the bracket includes a main body. The bracket further includes an arm extending away from the main body. The arm extends away from the main body to support the free end of the pin to further support the pin during a latched construction. The main body of the bracket and the arm of the bracket support the free end of the pin during rotation of the seat portion towards the seat back from a down position to an up position allowing for a fixed latch on the seat back to engage with the pin of the seat portion.

DETAILED DESCRIPTION OF THE INVENTION

The present invention relates to a striker pin support bracket for supporting a striker pin in a seat assembly, specifically a tip-up seat assembly. The striker pin and support bracket are mounted to a seat portion of a seat assembly. The striker pin includes an unsupported free end which becomes fully supported with the inclusion of the striker pin support bracket.

Figure 1:
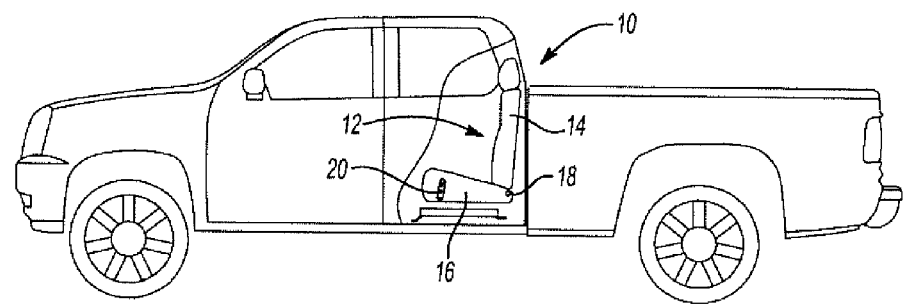
FIG. 1 illustrates a side environmental view of a vehicle including a seat assembly of the present invention.

FIG. 1 illustrates an environmental view of a vehicle 10 including the tip-up seat assembly 12. The seat assembly 12 includes a seat back 14 and a seat portion 16. The seat portion 16 is pivotally mounted to the seat back 14 at a first pivot point 18. The seat assembly 12 further includes a release handle 20 for moving the seat from a down position to a tipped-up position.

Figure 2:
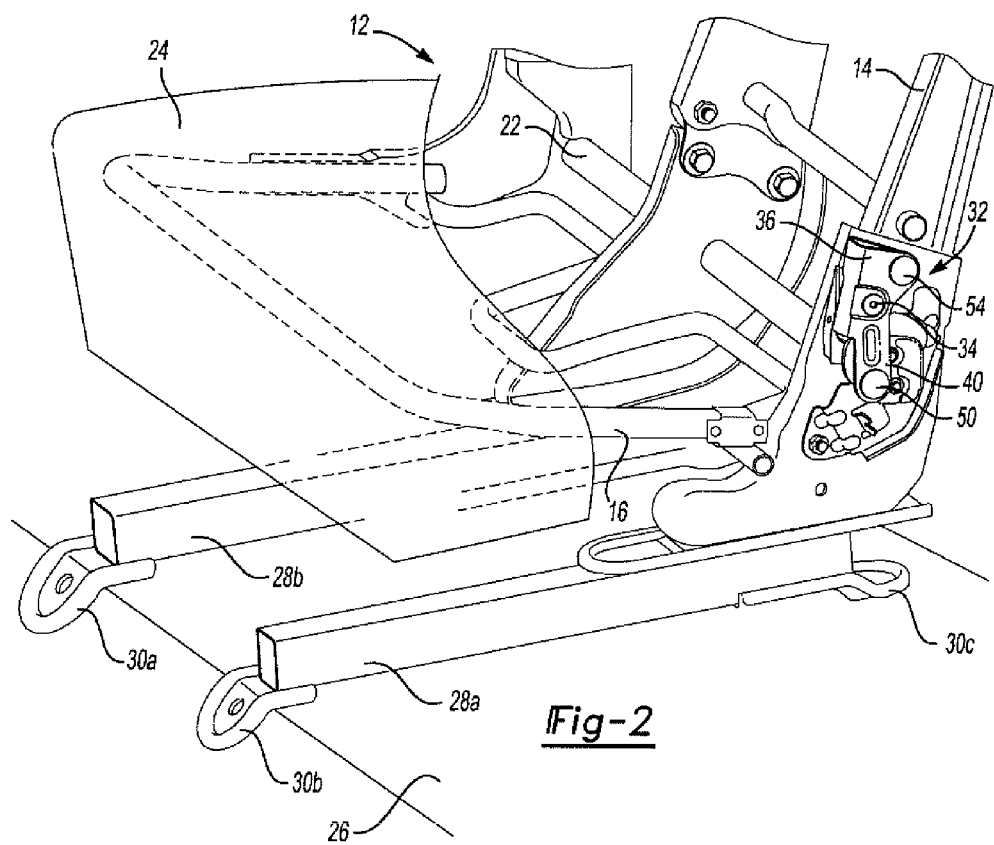
FIG. 2 illustrates a perspective view of the striker pin support bracket in an installed position.

FIG. 2 illustrates the seat assembly 12 having the seat portion 16 and the seat back 14. The seat assembly 12 further includes various support elements 22. The seat portion 16 of the seat assembly 12 is further covered in a cushioning foam 24. The cushioning foam 24 is made of a soft foam material and may be covered in a fabric, leather, or leather-like material to provide comfort to the user of the seat assembly 12.

The seat assembly 12 mounts to a floor 26. The seat assembly 12 mounts to the floor 26 by means of a plurality of support beams 28a, 28b and a plurality of brackets 30a, 30b, 30c.

Figure 3:
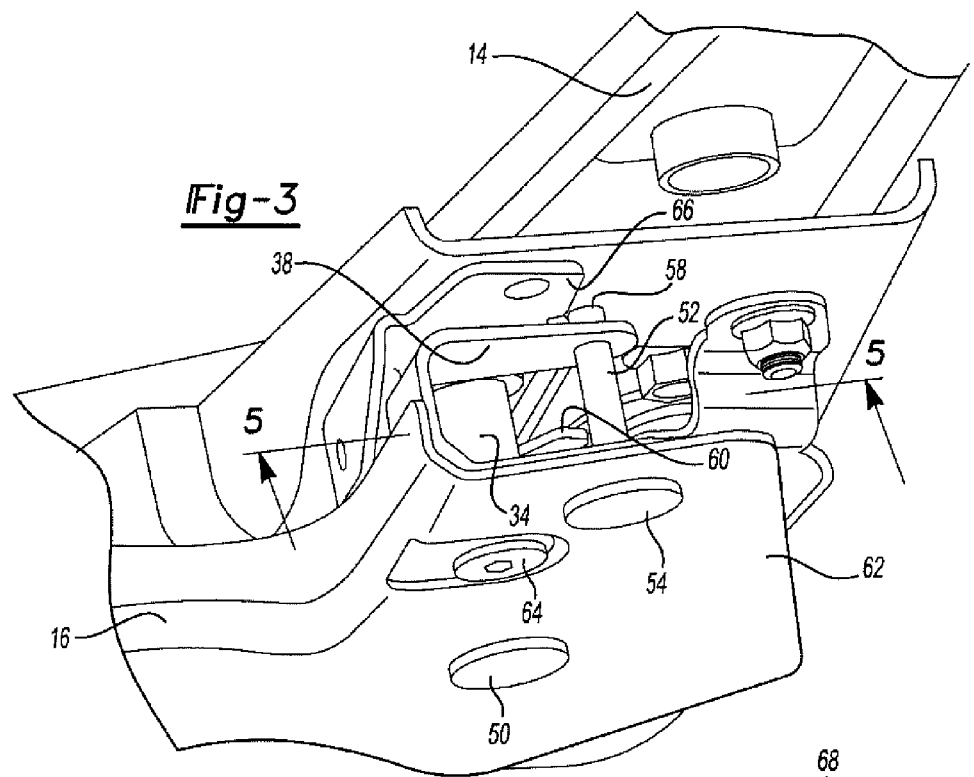
FIG. 3 illustrates a top perspective view of the striker pin support bracket in an installed position.
Figure 4:
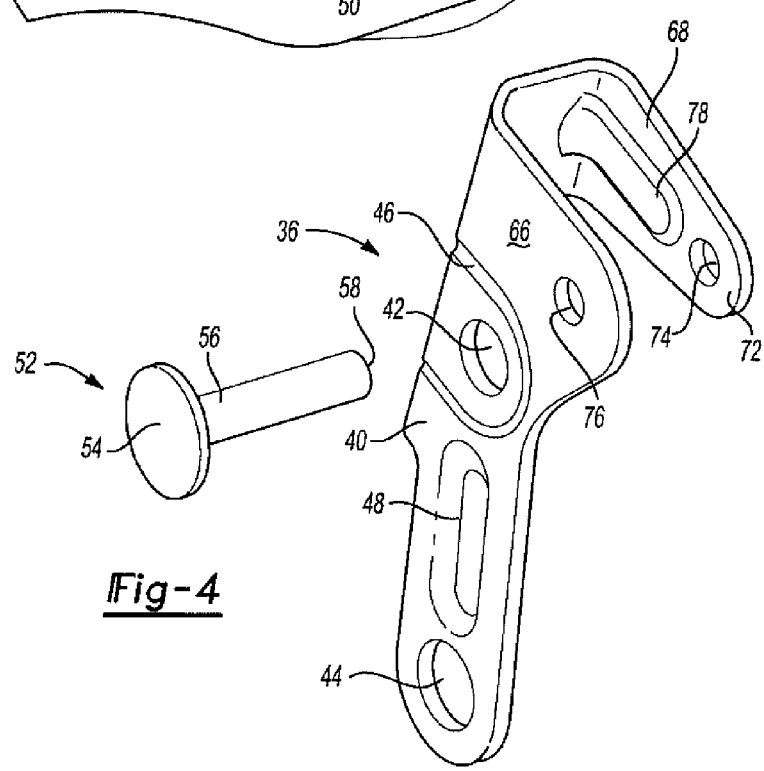
FIG. 4 illustrates a perspective view of an exploded striker pin support bracket.
Figure 5:
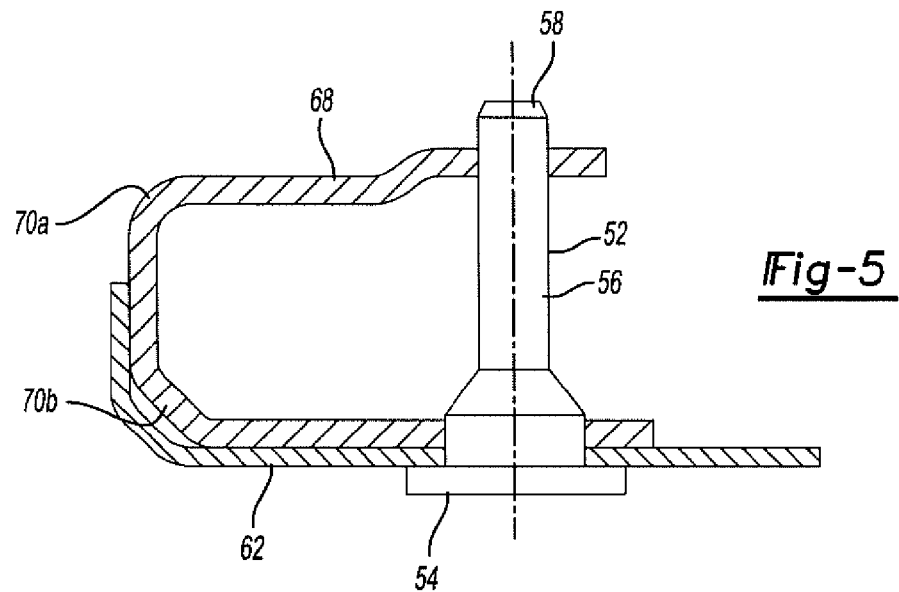
FIG. 5 illustrates a cross-sectional view of the striker pin, striker pin support bracket, and trim cover along the line 5-5.

A striker pin support bracket 32 is shown pivotally mounted to the seat assembly 12 about a main pivot 34. FIGS. 2 and 3 illustrate the specific configuration of the striker pin support bracket 32. The striker pin support bracket 32 includes a main body 36 and an arm 38. In the present embodiment, the main body 36 includes an elongated portion 40 to provide further support to the striker pin support bracket 32. The elongated portion 40 includes a main pivot aperture 42 and a second securing aperture 44 to further secure the striker pin support bracket 32 to the seat assembly 12. Various indentations 46, 48 are provided on the striker pin support bracket 32 to provide further strength to the overall structure of the striker pin support bracket 32. The striker pin support bracket 32 is made of a steel, or other metal, or a strong plastic or polymer. The invention is not limited by the material used. A securing bolt 50 is positioned through the securing aperture 44 on the elongated portion 40 of the main body 36 of the striker pin support bracket 32. The securing bolt 50, along with a striker pin 52, are connected to the seat portion 16 of the seat assembly 12.

Figure 6:
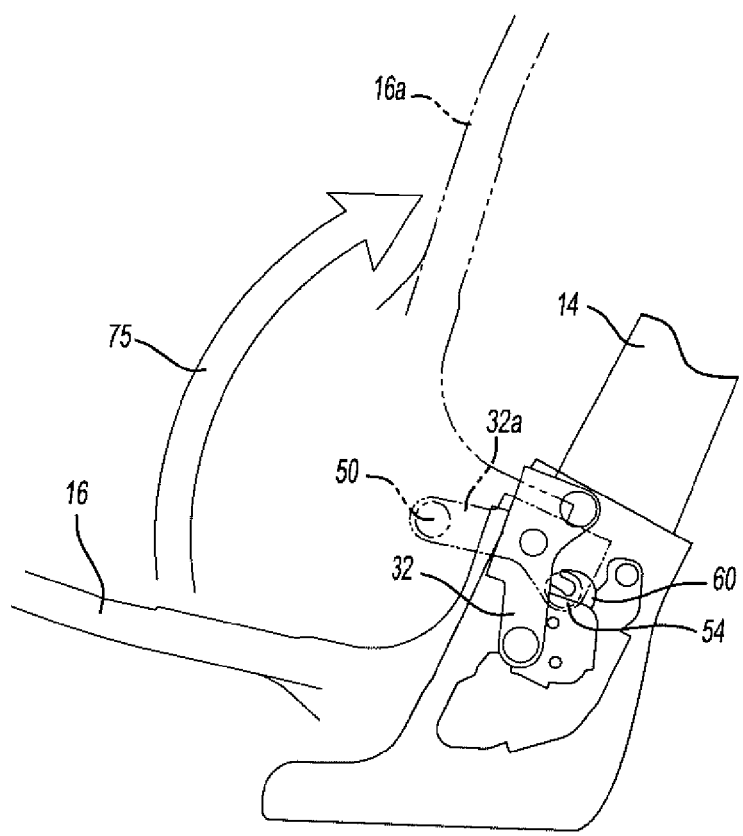
FIG. 6 illustrates a side view of the striker pin support bracket and seat assembly when the seat moves from a down position to an up position.

The striker pin 52 includes a striker pin head 54 and a pin shaft 56. The striker pin 52 further includes a free end 58 which is normally unsupported by the seat assembly 12. A latch 60, as shown in FIGS. 3 and 6, engages with the pin shaft 56 of the striker pin 52. Without the inclusion of the striker pin support bracket 32, the latch 60 may not properly engage, or may prematurely disengage, from the striker pin 52.

The seat portion 16 further includes a trim cover 62. The securing bolt 50, a main pivot bolt 64, and the striker pin 52 all connect with the trim cover 62. A first surface 66 on the striker pin support bracket 32 rests adjacent to the back side of the trim cover 62.

The seat portion 16 pivotally connects to the seat back 14 at a main pivot point 34. The main pivot point 34 pivots about the main pivot pin or bolt 64. The bolt 64 pay also be a pin. The main pivot bolt 64 connects to the seat back 14. The main pivot bolt 64 is further supported by the support bracket 32.

The striker pin support bracket 32 includes the main body 36 and an extended curved arm 68. The arm 68, in the present embodiment, is generally C-shaped or U-shaped having curved portions 70a, 70b. The arm 68 extends and curves around to an end portion 72. A structural support 78 is further provided within one of the curved portions. The end portion 72 includes a striker pin 52 securing aperture 74 to secure the free end 58 of the striker pin 52. Corresponding aperture 76 is operable to accept and hold the striker pin 52, particularly the pin shaft 56 of the striker pin 52. Once the free end 58 of the striker pin 52 is supported by the arm 68 of the striker pin support bracket 32, the latch 60 connected to the seat back 14 of the seat assembly 12 can easily engage with the pin shaft 56 of the striker pin 52. The arm 68 supports the free end 58 of the striker pin 52 to prevent premature unattachment of the latch 60 from the striker pin shaft 56.

FIG. 6 and movement arrow 75 illustrate the seat portion 16 moving from a down position to an up locked position as shown by seat portion 16a. As the seat portion 16 moves from a down position to an up position, the striker pin support bracket 32 moves to the position as seen by striker pin support bracket 32a. As the seat portion 16 moves from a down position to an up position, the striker pin 52 engages with the latch 60 to lock and secure the seat portion in the up position.

Figure 7:
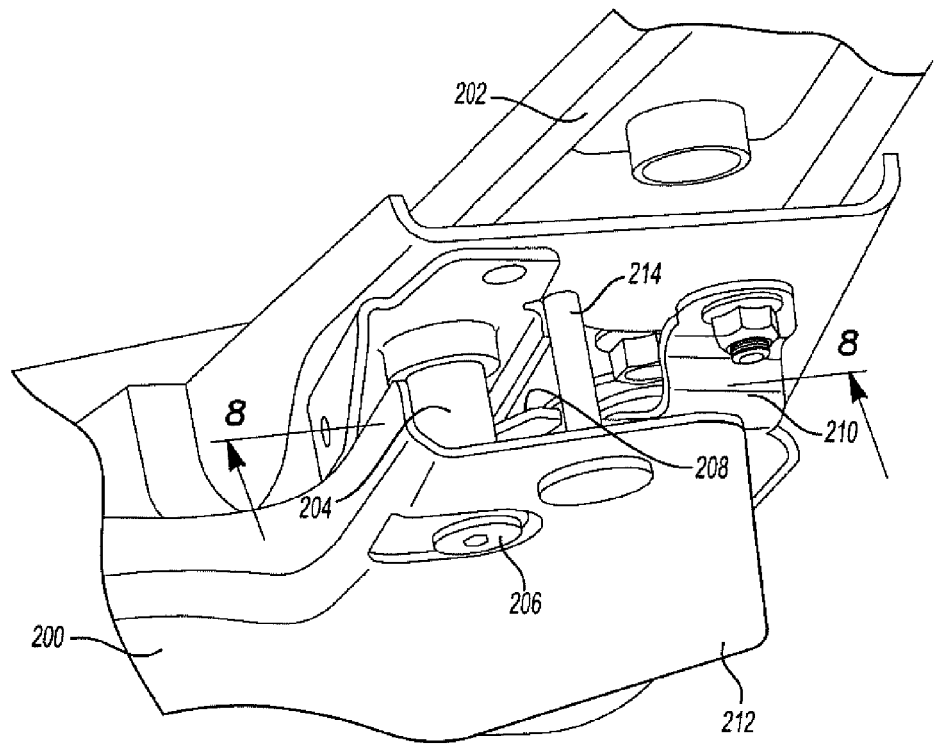
FIG. 7 illustrates the unsupported striker pin of the prior art.
Figure 8:
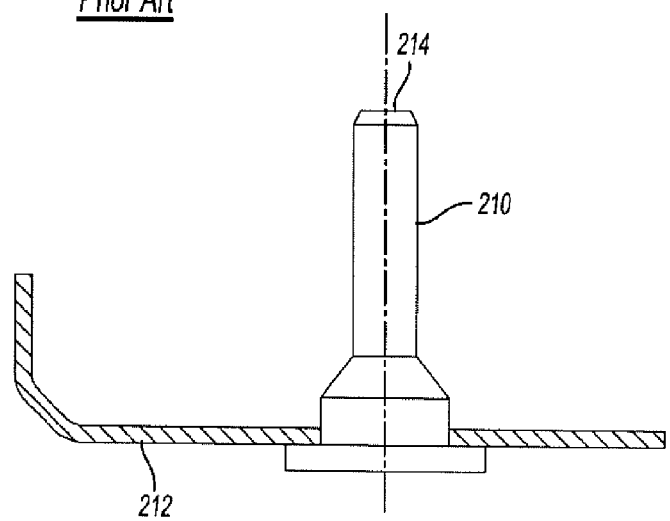
FIG. 8 illustrates a cross-sectional view along the line 8-8 of the unsupported striker pin of the prior art.

FIGS. 7 and 8 illustrate the prior art. The prior art includes a seat portion 200 and a seat back 202. The seat portion 200 is pivotally mounted about a main pivot 204 to the seat back 202. A main pivot bolt 206 is provided allowing the seat portion 200 to rotate about the main pivot 204. A latch 208 is provided connected to the seat back 202. The main pivot bolt 206 and a striker pin 210 are provided to engage with a trim cover 212. A free end 214 of the striker pin 210 is unsupported and thus creates problems when the latch 208 attempts to engage with the striker pin 210.

The present invention is not restricted to the illustrative examples and embodiments described above. The embodiments are not intended as limitations on the scope of the invention. Methods, apparatus, compositions, and the like described herein are exemplary and not intended as limitations on the scope of the invention. Changes therein and other uses will occur to those skilled in the art. The scope of the invention is defined by the scope of the appended claims.

The invention claimed is:

1. An automotive vehicle seat assembly, the assembly comprising:
    a seat portion and a seat back, the seat back having a fixed latch, the seat portion pivotally connected to the seat back at a main pivot, the seat portion including a trim cover;
    a pin mounted to the seat portion, the pin having distal end spaced apart from the seat portion; and
    a bracket positioned adjacent to the trim cover of the seat portion, the bracket including a main body, the main body of the bracket connected to the main pivot of the seat portion and the seat back, the main body spaced apart from the seat portion, the bracket further including an arm extending away from the main body, the arm adapted to support distal end of the pin, the pin being a separate piece from the arm of the bracket;
    wherein the main body of the bracket and the arm of the bracket support the distal end of the pin during rotation of the seat portion towards the seat back from a down position to an up position allowing for the fixed latch on the seat back to engage with the pin of the seat portion thereby preventing misconnection of the latch to the pin or unwanted unlatching of the pin from the latch.

2. The automotive vehicle seat assembly of claim 1 wherein the main body of the bracket is elongated.

3. The automotive vehicle seat assembly of claim 2 wherein the main body includes a second connection point on the seat portion.

4. The automotive vehicle seat assembly of claim 1 wherein the pin extends through the main body of the bracket.

5. The automotive vehicle seat assembly of claim 1 wherein the bracket includes at least one localized indentation to increase strength of the bracket.

6. The automotive vehicle seat assembly of claim 1 wherein the arm of the bracket is generally U-shaped.

7. The automotive vehicle seat assembly of claim 1 wherein the latch is fixed and the pin rotates towards the latch to engage.

8. The automotive vehicle seat assembly of claim 1 wherein the seat portion is movable from a down position to an up locked position.

9. The automotive vehicle seat assembly of claim 1 wherein the seat assembly is a tip-up seat.

10. The automotive vehicle seat assembly of claim 1 wherein the arm of the bracket includes an aperture adapted to connect with the pin.

11. The automotive vehicle seat assembly of claim 1 wherein the main body and the arm of the bracket both connect with the pin.

12. The automotive vehicle seat assembly of claim 11 wherein the main body and the arm both include apertures adapted to connect with the pin.

\* \* \* \* \*